United States Patent
Ogata et al.

(10) Patent No.: US 7,891,408 B2
(45) Date of Patent: Feb. 22, 2011

(54) METHOD OF PRODUCING ANTI-ALUMINA-BUILDUP IMMERSION NOZZLE FOR CONTINUOUS CASTING

(75) Inventors: Koji Ogata, Kitakyushu (JP); Donald Bruce Hoover, York, PA (US)

(73) Assignees: Krosakiharima Corporation, Fukuoka (JP); LWB Refractories Company, York, PA (US)

( * ) Notice: Subject to any disclaimer, the term of this patent is extended or adjusted under 35 U.S.C. 154(b) by 170 days.

(21) Appl. No.: 12/316,212

(22) Filed: Dec. 10, 2008

(65) Prior Publication Data

US 2009/0096124 A1  Apr. 16, 2009

Related U.S. Application Data

(63) Continuation of application No. 10/524,622, filed as application No. PCT/JP2003/010473 on Aug. 19, 2003, now abandoned.

(30) Foreign Application Priority Data

Aug. 20, 2002 (JP) .............................. 2002-239941

(51) Int. Cl.
 *B22D 11/10* (2006.01)
 *B22D 41/54* (2006.01)

(52) U.S. Cl. ........................ 164/488; 164/437; 222/591; 222/606

(58) Field of Classification Search ................. 164/488, 164/437; 222/591, 606; 427/181, 230
See application file for complete search history.

(56) References Cited

FOREIGN PATENT DOCUMENTS

JP  62-288161 A  * 12/1987

* cited by examiner

*Primary Examiner*—Kevin P Kerns
(74) *Attorney, Agent, or Firm*—Jordan and Hamburg LLP

(57) ABSTRACT

A method of producing an immersion nozzle for continuous casting, which includes integrally molding a first zirconia-graphite compound applied to a powder-line portion of the nozzle, and a second compound applied to at least an inner hole portion of the nozzle. The second compound includes 10 mass % or more of clinker particles each containing CaO as a mineral phase, and the surface of at least a part of the clinker particles is subjected to an anti-hydration treatment, such as a heat treatment to be performed under a $CO_2$ atmosphere to convert CaO to $CaCO_3$. The method can suppress volume expansion caused by the reaction between CaO and water released from resin added as binder, so as to prevent the occurrence of cracks during a burning process of the molded piece.

12 Claims, 1 Drawing Sheet

METHOD OF PRODUCING ANTI-ALUMINA-BUILDUP IMMERSION NOZZLE FOR CONTINUOUS CASTING

This application is a Continuation of application Ser. No. 10/524,622, now abandoned, filed on Mar. 17, 2005.

TECHNICAL FIELD

The present invention relates to a method of producing an immersion nozzle for continuous casting, and more particularly to a method of producing an anti-alumina-buildup immersion nozzle with an inner hole whose wall surface serving as a molten-steel flow passage is formed of a CaO-containing material to prevent buildup of alumina thereon.

BACKGROUND ART

With increasingly strict quality control demanded of steel products, the buildup of non-metallic inclusions, such as alumina, on the wall surface of an inner hole of a submerged or immersion nozzle has a serious disadvantage for steel production. Therefore, a good deal of effort has been made to reduce the buildup of non-metallic inclusions, such as alumina, on the wall surface of an inner hole of an immersion nozzle for continuous casting (hereinafter referred to as "immersion nozzle" or "nozzle").

As one of measures against the alumina buildup, there has been known a technique in which argon gas is injected from the inner surface of a nozzle into molten steel to prevent the alumina buildup in physical manner. In this technique, if the argon gas is injected excessively, bubbles of the injected argon gas will be incorporated into molten steel to form pinholes in slabs. Thus, due to the restriction in the allowable injection amount of argon gas, this method cannot be fully employed as a sufficient measure to prevent alumina buildup.

There has also been known a technique intended to provide an anti-alumina-buildup function to refractories themselves. For example, Japanese Patent Laid-Open Publication No. 57-71860 discloses a casting nozzle using refractories including a combination of graphite and either one of sintered calcia, fused calcia and another ceramic material containing a CaO component. This invention is intended to induce a reaction between CaO contained in the refractories and alumina attached on the wall surface of a nozzle inner hole so as to form a low-melting-point or fusible substance to prevent the alumina buildup.

Such CaO-containing refractories exhibit a certain level of anti-alumina-buildup effect. In particular, refractories using a clinker containing CaO as a mineral phase, such as calcia-magnesia clinkers including calcia clinker and dolomite clinker, have an excellent effect.

For this reason, immersion nozzles have been increasingly produced by integrally molding a compound using a clinker containing CaO as a mineral phase, which is applied to only an inner hole portion of an immersion nozzle or an nozzle body including the inner hole portion, and a zirconia-graphite compound applied to a powder-line portion of the nozzle, and then burning the molded piece in a reduction atmosphere.

This production method involves a problem concerning cracks to be generated at the boundary between the different compositions during the burning process. This would be because phenol resin, which is added to the CaO-containing refractories at about several % to less than 20% as a binder or for forming a carbon bond in the refractory matrix, decomposes during heating to release water therefrom, and the resulting hydration reaction between the water and the CaO contained as a mineral phase in the clinker causes volume expansion different from the expanding behaviors in other portions during heating.

Japanese Patent Laid-Open Publication No. 2000-514394 proposes one measure against this problem, in which a CaO-containing powder is added into a zirconia-graphite compound for use in a powder-line portion so as to equalize expanding behavior in each portion to prevent the occurrence of cracks. However, the CaO-containing powder added to the zirconia-graphite compound causes deterioration in corrosion resistance, resulting in undesirably deteriorated durability of a powder-line portion to be formed of the compound.

DISCLOSURE OF INVENTION

In view of the problem in the conventional immersion-nozzle production method comprising integrally molding a zirconia-graphite compound applied to a powder-line portion of an immersion nozzle, and a compound using a clinker containing CaO as a mineral phase, which is applied to at least an inner hole portion of the nozzle to prevent alumina buildup, and then burning the molded piece in a reduction atmosphere, it is therefore an object of the present invention to provide an improved immersion-nozzle production method capable of preventing the occurrence of cracks to be generate during the burning process.

Through research working towards solving the above conventional problem, the inventor found that one factor of the occurrence of cracks as the problem in the conventional production method, or the volume expansion arising during the burning process, can be prevented by subjecting the clinker containing CaO as a mineral phase to an anti-hydration treatment so as to suppress the hydration reaction between the CaO and the water released from the resin. The present invention has been accomplished based on this knowledge.

Specifically, the present invention provides a method of producing an immersion nozzle for continuous casting, which has zirconia-graphite refractories applied to a powder-line portion thereof. The method comprises integrally molding the zirconia-graphite refractories, and a compound applied to at least an inner hole portion of the immersion nozzle. The compound includes 10 weight % or more of clinker particles each containing CaO as a mineral phase, wherein the surface of at least a part of the particles is subjected to an anti-hydration treatment.

The anti-hydration treatment for the clinker containing CaO as a mineral phase may specifically performed by converting the CaO exposed outside from the surface of the clinker particle, to a compound nonreactive with water, or by coating the entire clinker particle with a film impermeable to water.

In the former treatment, the CaO may be converted to a water-stable compound, such as $CaCO_3$, $CaSO_4$ or $Ca_3(PO_4)_2$. For example, the CaO may be converted to $CaCO_3$ by subjecting untreated clinker to a heat treatment under a $CO_2$ atmosphere at a temperature of 300 to 850° C.

In the latter treatment for coating the entire clinker particle with a film impermeable to water, the water-impermeable film may be formed using heat-resistant resin, such as silicone resin; pitch; or magnesium sulfate.

Among the above anti-hydration treatment, the treatment of converting the CaO exposed outside from the surface of the clinker particle, to $CaCO_3$, is most preferable in view of treatment cost, anti-hydration performance, and influence on the quality of the refractories after the burning process.

While it would be preferable to subject all of the clinker particles to the anti-hydration treatment, only a part of the clinker particles may be subjected to the treatment as long as an intended effect can be achieved.

The refractory compound comprising calcia-magnesia clinker including a dolomite clinker and a calcia clinker containing CaO as a mineral phase may be a mixture of such clinkers and binder. The refractory compound may selectively include any other suitable aggregate, such as $CaZrO_3$ clinker containing CaO without CaO as a mineral phase, material primarily consisting of a $CaO$-$SiO_2$ clinker and another CaO-based compound, oxide, carbide or carbon, etc.

In view of the anti-alumina-buildup function, the amount of the clinker particles each containing CaO as a mineral phase is 10 mass % or more, preferably 20 mass % or more, even more preferably 30 mass % or more, on the basis of 100 mass % of the entire compound. The body of the immersion nozzle may be made of any suitable conventional material.

BEST MODE FOR CARRYING OUT THE INVENTION

Figure 1:
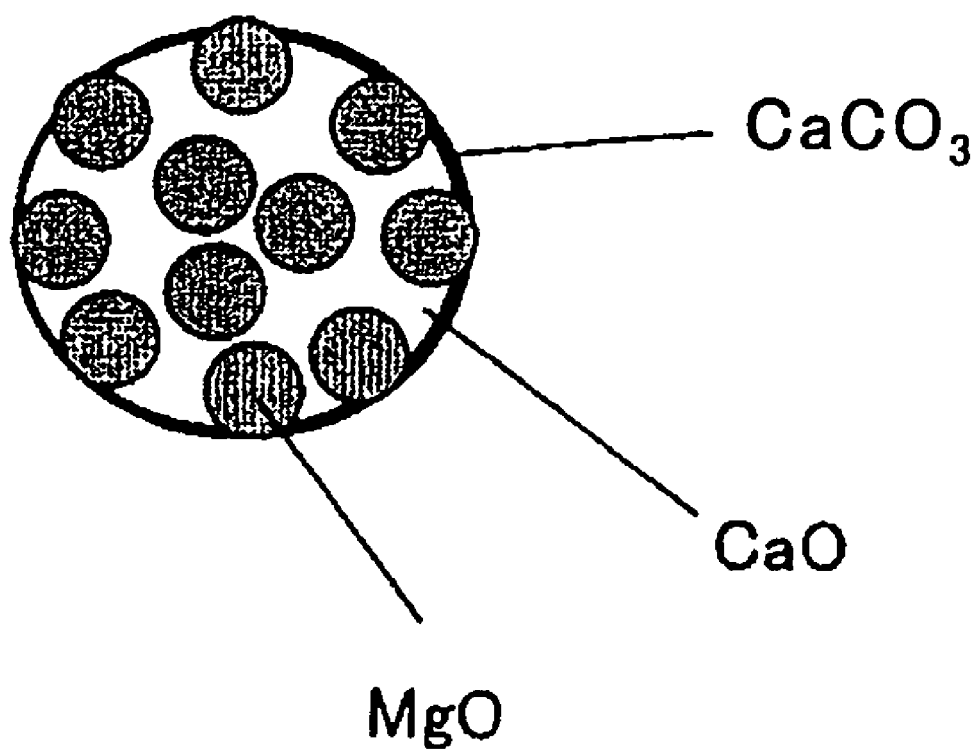
FIG. 1 is a schematic sectional view of a dolomite clinker subjected to an anti-hydration treatment in one embodiment of the present invention.

A preferred embodiment of the present invention will now be described in connection of the Examples.

Table 1 shows the composition of compound including clinker particles each containing CaO as a mineral phase, the application of a heat treatment performed under a $CO_2$ atmosphere to convert the CaO exposed outside from the surface of the clinker particle, to $CaCO_3$, and the inspection result of the presence of cracks after the burning process.

Each specimen for the testing was prepared by applying a zirconia-graphite on the powder-line portion and a compound shown in Table 1 onto the main body or the inner hole portion other than the powder-line portion, and carrying the whole body to CIP molding under a pressure of 1000 Kg/cm$^2$, or 98 Mpa, and burning under a reduction atmosphere at a temperature of 1000° C.

In Table 1, all of the dolomite clinker particles in Inventive Examples 1 to 3 were subjected to a heat treatment under a $CO_2$ atmosphere, or an anti-hydration treatment. The dolomite clinker particles in Comparative Examples 1 to 3 were conventional clinkers without application of the anti-hydration treatment. The compound to be applied to the portion of the nozzle other than the powder-line portion comprises either one of clinkers as shown in Table 1, which contains CaO as a mineral phase. This compound was prepared by homogenously kneading the clinker particles and an appropriate amount of phenol resin added thereto. The zirconia-graphite compound comprises 90 mass % of zirconia and 10 mass % of graphite. The zirconia-graphite compound was prepared by homogenously kneading the zirconia, the graphite and an appropriate amount of phenol resin added thereto, and commonly applied to all of the immersion nozzles in Table 1.

FIG. 1 is a schematic sectional view of the dolomite clinker particle as shown in Table 1, which is subjected to an anti-hydration treatment for converting CaO contained in the clinker particle and exposed outside from the surface of the clinker particle, to $CaCO_3$.

Each of Inventive Examples 1 to 3 using the clinker particles subjected to the anti-hydration treatment could avoid the occurrence of cracks during the burning process. In contrast, all of Comparative Examples 1 to 3 had transverse cracks at the boundary between the CaO-containing refractories and the zirconia-graphite refractories.

Table 1 also shows Inventive Examples 4 to 6 each of which includes calcia clinker particles and dolomite clinker particles which are subjected to the heat treatment under a $CO_2$ atmosphere, or the anti-hydration treatment. The dolomite clinker particles in Comparative Examples 4 to 6 were conventional clinkers without application of the anti-hydration treatment. In Inventive Examples 4 to 6 and Comparative Examples 4 to 6, the nozzle body was formed of a magnesia-graphite compound prepared by adding an appropriate amount of phenol resin to 70 mass % of magnesia and 30 mass % of graphite, and homogenously kneading them. A compound including clinker particles each containing CaO as a mineral phase was applied only to the inner hole portion.

As seen in the results of Inventive Examples 4 to 6 and Comparative Examples 4 to 6, each of Inventive Examples

TABLE 1

|  |  | Comparative Example | | | Inventive Example | | | Comparative Example | | | Inventive Example | | |
| --- | --- | --- | --- | --- | --- | --- | --- | --- | --- | --- | --- | --- | --- |
|  |  | 1 | 2 | 3 | 1 | 2 | 3 | 4 | 5 | 6 | 4 | 5 | 6 |
| Compounding ratio (mass %) | graphite (0.5 mm ≧) | 25 | 35 | 35 | 25 | 35 | 35 | 10 | — | — | 10 | — | — |
|  | dolomite clinker (1 mm ≧) | 20 | 15 | 15 | 20 | 15 | 15 | — | — | — | — | — | — |
|  | dolomite clinker (0.2 mm ≧) | 35 | 30 | 30 | 35 | 30 | 30 | 35 | 40 | 40 | 35 | 40 | 40 |
|  | dolomite clinker (0.074 mm ≧) | 20 | 20 | — | 20 | 20 | — | 35 | 35 | — | 35 | 35 | — |
|  | magnesia clinker (0.074 mm ≧) | — | — | 20 | — | — | 20 | — | — | 35 | — | — | 35 |
|  | calcia clinker (1 mm ≧) | — | — | — | — | — | — | 20 | 25 | 25 | 20 | 25 | 25 |
| Application of $CO_2$ treatment to clinker *1 | | NO | NO | NO | YES | YES | YES | NO | NO | NO | YES | YES | YES |
| Presence of cracks after burning process | | YES | YES | YES | NO | NO | NO | YES | YES | YES | NO | NO | NO | using the clinker particles subjected to the anti-hydration treatment could avoid the occurrence of cracks during the burning process. In contrast, all of Comparative Examples had transverse cracks at the boundary between the zirconia-graphite refractories and the magnesia-graphite refractories, a part of which extended toward the outer periphery of the nozzle.

As mentioned above, the method of the present invention can provide an immersion nozzle for continuous casting, with an excellent anti-alumina-buildup function, while preventing the occurrence of cracks during the burning process to provide enhanced process yield. The obtained immersion nozzle can contribute to the improvement in operational efficiency of continuous casting and in steel quality.

INDUSTRIAL APPLICABILITY

The present invention is applicable to the production of an immersion nozzle for continuous casting, which uses a material containing CaO in the wall surface of an inner hole of the nozzle serving as a molten-steel flow passage to prevent alumina buildup.

What is claimed is:

1. A method of producing an immersion nozzle for continuous casting by which occurrence of cracks at a boundary between a CaO-containing refractory and a zirconia-containing refractory during a firing of the immersion nozzle in production thereof is prevented, the method comprising:
    subjecting at least a portion of clinker particles containing CaO as a mineral phase to an anti-hydration treatment to form said at least a portion of said clinker particle into surface-treated clinker particles;
    integrally molding a first refractory mixture and a second refractory mixture to form an integrally molded body with said immersion nozzle, said first refractory mixture being comprised of said clinker particles which include said surface-treated clinker particles, said first refractory mixture being applied to at least an inner-hole portion in a main body portion of the immersion nozzle to inhibit deposition of alumina thereon during said continuous casting;
    and said second refractory mixture being comprised of zirconia-graphite, said second refractory mixture being applied to a powder-line portion of the immersion nozzle; and
    performing the firing of the integrally formed body in a reducing atmosphere.

2. A method of inhibiting crack formation in different refractory compositions from occurring during a firing performed in production of an anti-alumina buildup immersion nozzle for continuous casting onto which said different refractory compositions are applied, the method comprising:
    subjecting at least a portion of clinker particles containing CaO as a mineral phase to an anti-hydration treatment to form said at least a portion of said clinker particles into surface-treated clinker particles;
    applying a first composition comprising a zirconia-graphite refractory to at least a powder-line portion of an immersion nozzle; and
    applying a second composition comprising the clinker particles which include said surface-treated clinker particles to at least a portion of an inner hole of said immersion nozzle or a nozzle body which includes said inner hole, said second composition comprising 10 mass % or more of said clinker particles.

3. The method according to claim 2, further comprising integrally molding the first and second compositions onto said immersion nozzle or a nozzle body to obtain an integrally molded product.

4. The method according to claim 3, further comprising burning said integrally molded product in a reducing atmosphere to obtain said anti-alumina buildup immersion nozzle.

5. The method according to claim 2, wherein said anti-hydration treatment to produce said surface-treated clinker particles comprises converting an outside surface of said at least a portion of said clinker particles to at least one of $CaCO_3$, $CaCO_4$ or $Ca_3(PO_4)_2$.

6. The method according to claim 2, wherein said anti-hydration treatment to produce said surface-treated clinker particles comprises subjecting untreated clinker to a heat treatment under a $CO_2$ atmosphere at a temperature of 300° to 850° C.

7. The method according to claim 2, wherein said anti-hydration treatment to produce said surface-treated clinker particles comprises coating an entire exterior surface of each of the at least a portion of said clinker particles with a film impermeable to water.

8. The method according to claim 7, wherein said coating comprises forming the film using a heat-resistant resin.

9. The method according to claim 8, wherein said heat-resistant resin is selected from the group consisting of silicone resin, pitch and magnesium sulfate.

10. The method according to claim 2, wherein said clinker particles comprise calcia-magnesia clinker particles.

11. The method according to claim 2, wherein said second composition comprises a resin.

12. The method according to claim 11, wherein said resin comprises a phenol resin.

* * * * *